UNITED STATES PATENT OFFICE.

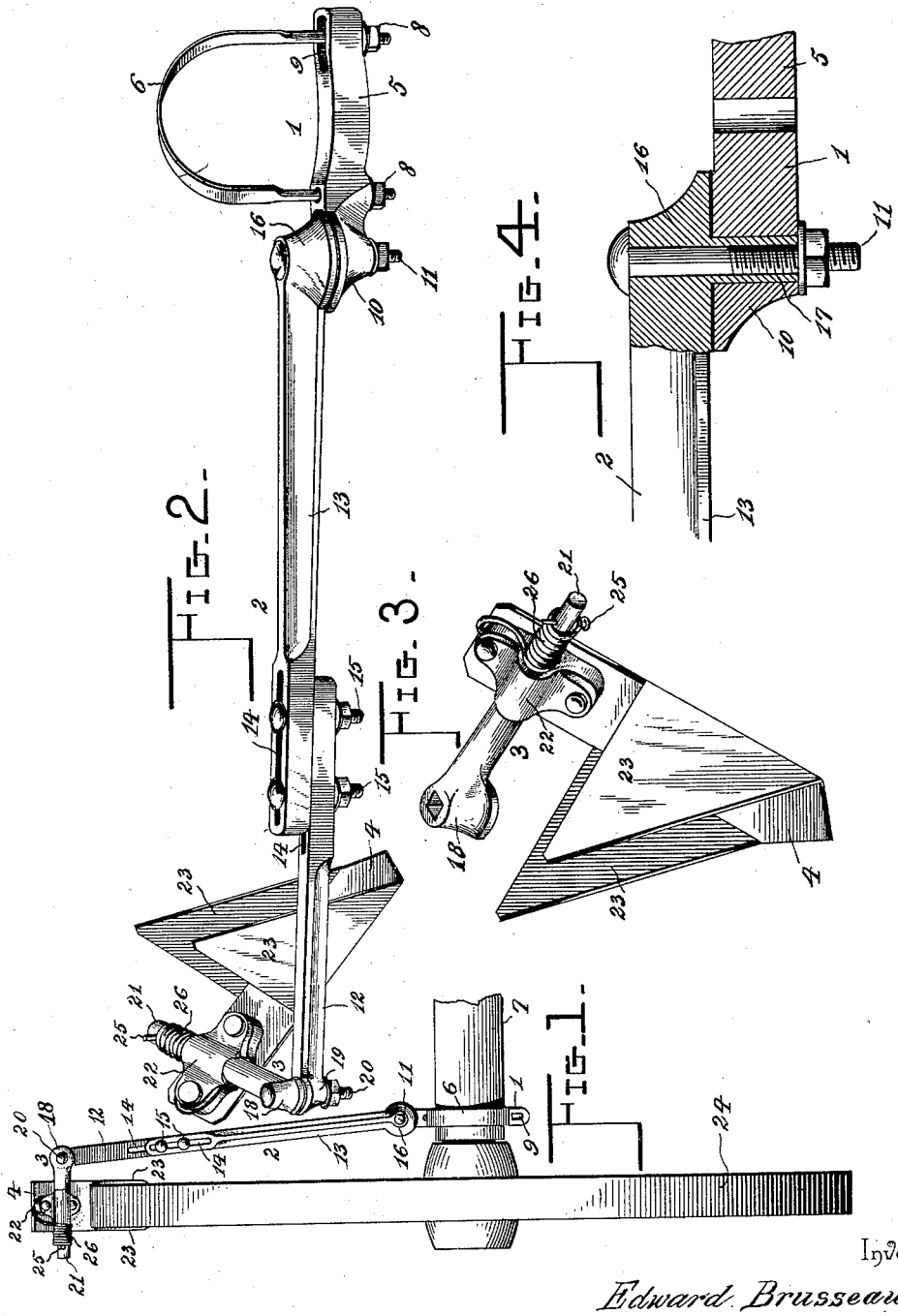

EDWARD BRUSSEAU, OF JEFFERSON, SOUTH DAKOTA.

VEHICLE-WHEEL SCRAPER.

SPECIFICATION forming part of Letters Patent No. 612,819, dated October 25, 1898.

Application filed December 13, 1897. Serial No. 661,675. (No model.)

*To all whom it may concern:*

Be it known that I, EDWARD BRUSSEAU, a citizen of the United States, residing at Jefferson, in the county of Union and State of South Dakota, have invented a new and useful Vehicle-Wheel Scraper, of which the following is a specification.

This invention provides means for removing mud and other adhering matter from the rims of vehicle-wheels, thereby keeping the same clear of obstructing matter, the means being in the form of a scraper and connections between the scraper and axle which will admit of the scraper following any lateral play which the wheel may have and adjustable to admit of the scraper being fitted to wheels of different diameters.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a detail view showing the invention operatively applied. Fig. 2 is a detail perspective view of the attachment. Fig. 3 is a detail view of the scraper and section upon which it is mounted. Fig. 4 is a detail section of the pivotal joint between the clip and extensible sections.

Corresponding and like parts are referred to in the following description and indicated in the several views of the drawings by the same reference characters.

The device comprises a clip-section 1, an extensible section 2, a scraper-section 3, and a scraper 4. The clip-section comprises a yoke 5 and a clip 6, the latter adapted to encircle the outer end of the axle 7 and having its end portions passing through openings at or near the ends of the yoke 5 and receiving nuts 8, by means of which the yoke and clip are firmly attached to the end portion of the axle. One of the openings in the yoke through which a member of the clip passes is elongated, forming a slot 9, thereby permitting the clip to adapt itself to axles of different size. One end of the yoke is formed with a circular head 10, which is apertured for the passage of a bolt 11, by means of which the clip and extensible sections are held together.

The extensible section 2 is composed of similarly-formed parts 12 and 13, having their inner or contiguous ends slotted, as shown at 14, and through which slots pass bolts 15 for securing the parts in an adjusted position. A circular head 16 is formed at one end of the part 13, and is apertured for the passage therethrough of the bolt 11, and is formed with a tubular extension 17 in line with the opening and which enters the opening of the head 10, thereby pivotally connecting the parts 5 and 13, the bolt 11 serving simply to prevent the separation of the parts. By this means an articulating joint is formed between the parts 5 and 13, so as to admit of the extensible section 2 and the parts carried thereby moving, whereby the scraper 4 can follow the lateral movements of the wheel without causing any binding.

The scraper-section 3 is formed with a circular head 18, corresponding with the circular head 19 at the outer end of the part 12, and these circular heads 18 and 19 have openings for the passage of a bolt 20, by means of which they are secured in an adjusted position. The outer end of the section 3 is reduced and made rounding, as shown at 21, and forms a journal for a bearing 22, riveted or otherwise secured to the shank of the scraper 4.

The scraper 4 is a steel blade having its active end pointed or of diamond shape and provided with wings 23, which flare slightly toward their outer ends and which are intended to come upon opposite sides of the rim of the vehicle-wheel 24, so as to remove mud or other matter clinging thereto. The active edges of the wings 23 incline and form a continuation of the active edges of the point, thereby serving to remove mud and other foreign substance in a thorough and effective manner. This scraper is mounted upon the journal 21 of the scraper-section and is held thereon by a pin or key 25, passing transversely through an opening in the outer end of the journal. A spring 26 is mounted upon the journal, and one end is secured thereto by means of the key 25 and its opposite end engages with the scraper, and this spring is normally under tension and serves to press the active end of the scraper against the vehicle-wheel rim, so as to clear the same of foreign matter in the manner set forth.

The members or parts of the extensible section 2 will vary in length according to the diameter of the vehicle-wheel for which the attachment is intended, and their form and means of attachment will vary according to the style of the vehicle with which the device is to be used; but the change will not be of such character as to depart from the spirit of the invention and will be one of design and adaptation simply.

Having thus described the invention, what is claimed as new is—

1. In a vehicle-wheel scraper, the combination of an inner section adapted to be firmly attached to a part of the vehicle and provided with a circular head having a vertical opening, an outer section bearing a scraper held in engagement with the rim of the vehicle-wheel and having a tubular extension journaled in the opening of the inner section, and a bolt connecting the two sections, substantially as set forth.

2. In a vehicle-wheel scraper, the combination of a yoke having a head formed with a vertical opening and provided with openings one of which is elongated, a clip adapted to pass through the last-mentioned openings for connecting the yoke to the axle, an outer section having pivotal connection with the head portion of the yoke, and a spring-actuated scraper applied to the outer section and normally held in engagement with the vehicle-wheel, substantially as set forth.

3. In a vehicle-wheel scraper, the combination of a support having a portion made rounding, a scraper comprising a blade having side wings at its active end, a bearing applied to the opposite end of the blade and receiving the round portion of the support, and a spring located at one side of the scraper and mounted upon its support and having its ends secured respectively to the scraper and support for normally holding the scraper in engagement with the vehicle-wheel, substantially as described.

4. In a vehicle-wheel scraper, a blade having a diamond-shaped point and flaring side wings, the active edges of the latter inclining and forming continuations of the active edges of the point, substantially as set forth.

5. The herein-described wheel-scraper, comprising a clip and a yoke, the latter having a slot for a member of the clip to pass through, an extensible section having pivotal connection at one end with the yoke, a scraper-section, a bolt for securing the scraper-section to the outer end of the extensible section at any required angular adjustment, a scraper-blade journaled upon a portion of the scraper-section, and a spring interposed between the blade and scraper-section for normally holding the blade in engagement with the vehicle-wheel rim, substantially as set forth.

In testimony that I claim the foregoing as my own I have hereto affixed my signature in the presence of two witnesses.

EDWARD BRUSSEAU.

Witnesses:
G. C. ALLARD,
P. J. W. PINARD.